United States Patent [19]

Schnüg

[11] 4,314,240
[45] Feb. 2, 1982

[54] DEVICE FOR LOCATING PERSONS

[76] Inventor: Manfred Schnüg, 8986 Mittelberg, Kleinwalsertal, Fed. Rep. of Germany

[21] Appl. No.: 109,235

[22] Filed: Jan. 3, 1980

[30] Foreign Application Priority Data

Jan. 15, 1979 [DE] Fed. Rep. of Germany ... 7900927[U]

[51] Int. Cl.³ .............................................. G08B 25/00
[52] U.S. Cl. ................................... 340/573; 340/571; 340/371
[58] Field of Search ............... 340/573, 571, 575, 568, 340/689, 366, 371

[56] References Cited

U.S. PATENT DOCUMENTS

| 3,248,723 | 4/1966 | Miethe | 340/689 |
| 3,614,763 | 10/1971 | Yannuzzi | 340/689 |
| 3,725,896 | 4/1973 | Wagner | 340/689 |
| 3,911,425 | 10/1975 | Muncheryan | 340/689 |

Primary Examiner—Alvin H. Waring

[57] ABSTRACT

An apparatus for locating a person covered by snow or the like comprising a portable housing adapted for being carried by a person and including a radio transmitter and a device for optically indicating the orientation of the housing with respect to the vertical. The latter device comprises a chamber containing a fluid and balls or similar objects floating in the fluid. An illumination system can be provided to illuminate the floating balls and thereby establish for the viewer the position of the horizontal and thereby the orientation of the housing with respect to the vertical.

9 Claims, 1 Drawing Figure

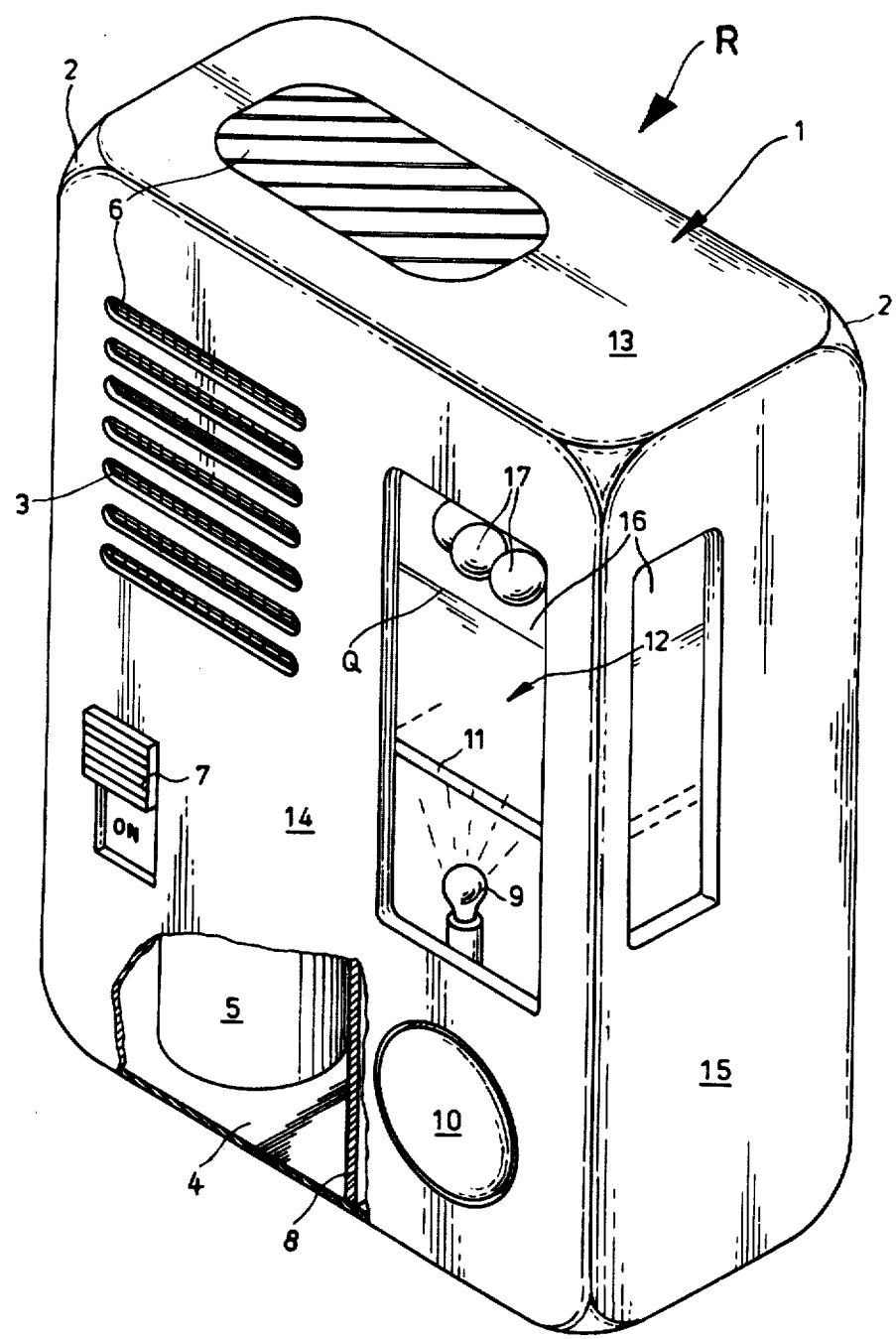

DEVICE FOR LOCATING PERSONS

FIELD AND BACKGROUND OF THE INVENTION

The invention relates to a device for locating a person who is covered over by snow or the like. The method used for this up to now involves probes which are introduced by the members of the search party into the snow or avalanche.

SUMMARY OF THE INVENTION

The object of the invention is to develop such a device which not only allows the buried person to be located by a search party, but also assists in the work of freeing the buried person.

The object is achieved accorded to the invention in which a portable housing carried by the person, i.e., the skier or the like—contains a radio transmitter and a system which indicates optically the inclination of the device (and therefore that of the bearer). This latter system features a fluid which does not freeze even at low ambient temperatures and has objects floating in it, preferably plastic balls.

According to another feature of the invention at least one window-like opening is provided, through which the objects floating in the fluid can be seen; it is also possible to make the entire housing out of a transparent material so that all parts of the device are visible to the observer.

It has been found particularly favorable to make the space containing the fluid such that it can be illuminated either by a light emitting source directed onto the space containing the fluid, or else by a light source immersed in the fluid.

In order that the battery supplying the energy required to illuminate the fluid filled space and to power the radio transmitter is not drained unnecessarily, both power consuming functions of the device can be operated either singly or simultaneously by the bearer, for example by means of push buttons or sliding switches provided on the housing. The switches and likewise the shape of the housing should be designed such that all parts cannot cause damage.

BRIEF DESCRIPTION OF THE DRAWING

Further advantages, features and details of the invention are revealed by means of the following description of a preferred exemplified embodiment of the invention, and with the help of the drawing the sole figure of which shows a partly sectioned perspective view of the device.

DETAILED DESCRIPTION

A power source 5 is provided in a battery space 4 below a radio transmitter 3 in a rectangular parallel-piped shaped housing 1 with rounded edges 2. The radio transmitter 3 which is situated in the region of slits 6 in the housing 1 can be put into operation by means of a switch 7.

A wall 8 divides the battery space 4 from an illuminating system which comprises a light source 9 and a press button switch 10 which is incorporated in the power circuit for the light source.

The light source 9 is separated by a transparent sheet 11 from a space 12 containing a fluid. In another embodiment, the light source 9 can be encapsulated such that it is water tight and projects into the space 12 containing the fluid.

In the region of space 12, in at least one of the walls 13, 14, 15 of the housing 1, there are windows 16 behind which the fluid Q in space 12, which can, if desired, be illuminated, can be observed, and likewise visible are rubber or plastic balls 17 floating in the fluid Q.

The described device R. is preferably the size of a body which is approximately the shape of two cigarette packets laid side-by-side; however, any other desired dimensions are also possible. Usefully, however, the size should be such that a skier using the device can carry it and secure it to his clothing without it being a hindrance.

As a result of this device it is now possible to locate the user easily if he is buried by an avalanche; the radio transmitter 3 can be set to a particular wavelength corresponding to that of the receiver, to produce a whistling or buzzing tone in the latter thus allowing the position of the buried person to be determined.

The fluid in the plastic housing 1 contains glycerine or another alcohol which prevents the fluid from freezing even at very low ambient temperatures—, for example, $-40°$ C. Thanks to the illuminating system 9, 10, the balls 17 floating in the fluid Q can be observed and, independent of upthrust or gravity allow the orientation of the device to be recognized and can serve as a direction indicator for the buried person to direct his efforts to free himself.

What is claimed is:

1. Apparatus for locating a person covered by snow or the like comprising a portable housing adapted for being carried by a person, a radio transmitter in said housing, and means in said housing for optically indicating the orientation of the housing with respect to the vertical.

2. Apparatus as claimed in claim 1 wherein said means for optically indicating the orientation of the housing comprises a chamber in said housing, a fluid in said chamber and means floating in the fluid for indicating the level of the fluid.

3. Apparatus as claimed in claim 2 wherein said means floating in the fluid comprises balls.

4. Apparatus as claimed in claim 2 wherein said housing is provided with at least one window permitting viewing of the fluid in said chamber.

5. Apparatus as claimed in claim 4 further comprising means for illuminating said fluid.

6. Apparatus as claimed in claim 5 wherein said means for illuminating said fluid comprises a light source, a power source and switching means operatively connecting said light source and power source.

7. Apparatus as claimed in claim 6 comprising a second switch means operatively connecting said power source and said radio transmitter.

8. Apparatus as claimed in claim 1 wherein said housing is of rectangular shape with rounded corners and is made from a plastic material 9. Apparatus as claimed in claim 2 wherein said housing is made at least in part from a transparent material.

* * * * *